(12) United States Patent
Kondrk et al.

(10) Patent No.: US 11,260,728 B2
(45) Date of Patent: Mar. 1, 2022

(54) DISTRIBUTED HAZARD DETECTION SYSTEM FOR A TRANSPORT REFRIGERATION SYSTEM

(71) Applicant: Carrier Corporation, Palm Beach Gardens, FL (US)

(72) Inventors: Jason R. Kondrk, Clay, NY (US); Jamal Zarrabi, Les Andelys (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/910,429

(22) Filed: Jun. 24, 2020

(65) Prior Publication Data

US 2021/0001689 A1  Jan. 7, 2021

(30) Foreign Application Priority Data

Jul. 2, 2019 (EP) ..................................... 19305898

(51) Int. Cl.
  *B60H 1/32* (2006.01)
(52) U.S. Cl.
  CPC ................................. *B60H 1/3217* (2013.01)
(58) Field of Classification Search
  CPC .............. B60H 1/3217; B60H 1/00364; B60H 1/00821; B60H 1/00828; F25D 11/003; F25D 17/06; F25B 2500/22; F25B 2500/221; F25B 2500/222; F25B 2600/11
  See application file for complete search history.

(56) References Cited

U.S. PATENT DOCUMENTS

| 6,606,875 B1* | 8/2003 | Grand ................ B60H 1/00014 62/239 |
|---|---|---|
| 8,147,302 B2 | 4/2012 | Desrochers et al. |
| 8,973,380 B2 | 3/2015 | Bean, Jr. et al. |
| 9,879,871 B2* | 1/2018 | Goel ........................ F24F 11/83 |
| 10,094,605 B2 | 10/2018 | Tanaka et al. |
| 2013/0247594 A1 | 9/2013 | Sanders et al. |
| 2017/0234608 A1* | 8/2017 | Sato ...................... F25D 17/005 454/75 |
| 2018/0187917 A1 | 7/2018 | Suzuki et al. |
| 2018/0283725 A1 | 10/2018 | Ikawa et al. |
| 2018/0327179 A1* | 11/2018 | Papas .................... F25D 11/003 |
| 2019/0063808 A1* | 2/2019 | Suzuki ................. F24F 1/0007 |

(Continued)

FOREIGN PATENT DOCUMENTS

| CN | 101248345 B | 2/2013 |
|---|---|---|
| CN | 108779948 A | 11/2018 |

(Continued)

OTHER PUBLICATIONS

Extended European Search Report; Application No. 19305898.9; dated Dec. 18, 2019; 7 pages.

*Primary Examiner* — Marc E Norman
(74) *Attorney, Agent, or Firm* — Cantor Colburn LLP (57) ABSTRACT

A transport refrigeration system, comprising a primary controller; a refrigerated container with a plurality of compartments; a hazard detection system, comprising: an auxiliary controller; and a plurality of sensors respectively distributed in a plurality of compartments of a refrigerated container of the transport refrigeration system, each of the plurality of sensors operationally connected to and controlled by the auxiliary controller.

6 Claims, 6 Drawing Sheets

(56) References Cited

U.S. PATENT DOCUMENTS

2019/0331378 A1* 10/2019 Uehara ................ F25B 49/005
2020/0088434 A1* 3/2020 Diaz ........................ F24F 11/49

FOREIGN PATENT DOCUMENTS

| | | |
|---|---|---|
| CN | 109642761 A | 4/2019 |
| CN | 109661547 A | 4/2019 |
| EP | 3358278 A1 | 8/2018 |
| EP | 3418655 A1 | 12/2018 |
| EP | 3270077 B1 | 1/2019 |
| EP | 3348939 A1 | 4/2019 |
| JP | 3418346 B2 | 11/2018 |
| KR | 985132 B1 | 10/2010 |
| WO | WO-2016000041 A1 * 1/2016 ............... G01C 9/06 |
| WO | 2017083336 A1 | 5/2017 |
| WO | 2017109531 A1 | 6/2017 |
| WO | 2018154347 A1 | 8/2018 |
| WO | 2018181567 A1 | 10/2018 |

* cited by examiner

DISTRIBUTED HAZARD DETECTION SYSTEM FOR A TRANSPORT REFRIGERATION SYSTEM

CROSS-REFERENCE TO RELATED APPLICATIONS

This application claims the benefit of EP Application No. 19305898.9 filed Jul. 2, 2019, the disclosure of which is incorporated herein by reference in its entirety.

BACKGROUND

The disclosed embodiments relate to transport refrigeration systems and more specifically to a distributed hazard detection system for the transport refrigeration system.

Fruits, vegetables and other perishable items, including meat, poultry and fish, fresh or frozen, are commonly transported in a transport refrigeration system (transport refrigeration system). The transport refrigeration system may include a refrigerated container, for example a cargo box of a truck in the form of a trailer, or in an intermodal container. Accordingly, it is customary to provide a transport refrigeration system in operative association with the refrigerated container for cooling the atmosphere within the refrigerated container. The transport refrigeration system includes a refrigerant vapor compression system, also referred to as a transport refrigeration unit (TRU), and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes an engine, typically diesel powered. It is desirable to detect hazards, such as flammable gasses, within compartments of a refrigerated container.

SUMMARY OF THE DISCLOSED EMBODIMENTS

A transport refrigeration system, comprising a primary controller; a refrigerated container with a plurality of compartments; a hazard detection system, comprising: an auxiliary controller; and a plurality of sensors respectively distributed in a plurality of compartments of a refrigerated container of the transport refrigeration system, each of the plurality of sensors operationally connected to and controlled by the auxiliary controller.

In addition to one or more of the above disclosed features, or as an alternate, the plurality of sensors receive power from and communicate with the auxiliary controller.

In addition to one or more of the above disclosed features, or as an alternate, the system includes a plurality of fans operationally connected to the plurality of sensors and configured to draw air toward the plurality of sensors, and wherein the plurality of sensors detect refrigerant.

In addition to one or more of the above disclosed features, or as an alternate, the auxiliary controller is configured to transmit a first communication, to a primary controller of the transport refrigeration system, indicative of a detecting a hazard at one or more of the plurality of sensors.

In addition to one or more of the above disclosed features, or as an alternate, the auxiliary controller is configured to transmit a first communication, to the primary controller of the transport refrigeration system, indicative of determining at the auxiliary controller that a hazard condition is detected.

In addition to one or more of the above disclosed features, or as an alternate, the primary controller is configured to output a response including communicating an alert and/or engaging in a safety procedure when the primary controller receives the first communication.

In addition to one or more of the above disclosed features, or as an alternate, the system includes a primary display that is onboard the transport refrigeration system, and wherein the primary controller is configured to provide the alert on the primary display when the primary controller receives the first communication.

In addition to one or more of the above disclosed features, or as an alternate, the primary controller is configured to communicate over a wireless network, and the primary controller is configured to communicate the alert over the wireless network to one or more of a mobile device, a service station and a central server when one of the plurality of sensors detects refrigerant.

In addition to one or more of the above disclosed features, or as an alternate, the primary controller is configured to engaging the safety procedure by drawing air out of the plurality of compartments with the plurality of fans when the primary controller receives the first communication.

Further disclosed is a method of monitoring for hazards in a transport refrigeration system, comprising: monitoring for a hazard condition in a plurality of compartments of a refrigerated container of the transport refrigeration system by an auxiliary controller communicating with a plurality of sensors respectively distributed in the plurality of compartments; and determining at the auxiliary controller that the hazard condition is detected by one of the plurality of sensors.

In addition to one or more of the above disclosed features, or as an alternate, the method includes the auxiliary controller providing power to and communicating with the plurality of sensors.

In addition to one or more of the above disclosed features, or as an alternate, the monitoring for hazards includes drawing gaseous refrigerant toward the plurality of sensors with a plurality of fans respectively distributed in the plurality of compartments.

In addition to one or more of the above disclosed features, or as an alternate, the method includes transmitting a first communication, by the auxiliary controller to a primary controller of the transport refrigeration system, indicative of determining at the auxiliary controller that the hazard condition is detected.

In addition to one or more of the above disclosed features, or as an alternate, the method includes outputting by the primary controller, responsive to receiving the first communication, a response including communicating an alert and/or engaging in a safety procedure.

In addition to one or more of the above disclosed features, or as an alternate, the method includes outputting by the primary controller, responsive to receiving the first communication, the alert on a primary display for the transport refrigeration system.

In addition to one or more of the above disclosed features, or as an alternate, the method includes transmitting by the primary controller, responsive to receiving the first communication, the alert over a wireless network to one or more of a mobile device, a service station and a central server.

In addition to one or more of the above disclosed features, or as an alternate, the method includes engaging the safety procedure by the primary controller, responsive to receiving the first communication, including drawing air out of the plurality of compartments with the plurality of fans.

BRIEF DESCRIPTION OF THE FIGURES

The present disclosure is illustrated by way of example and not limited in the accompanying figures in which like reference numerals indicate similar elements.

DETAILED DESCRIPTION

Figure 1:
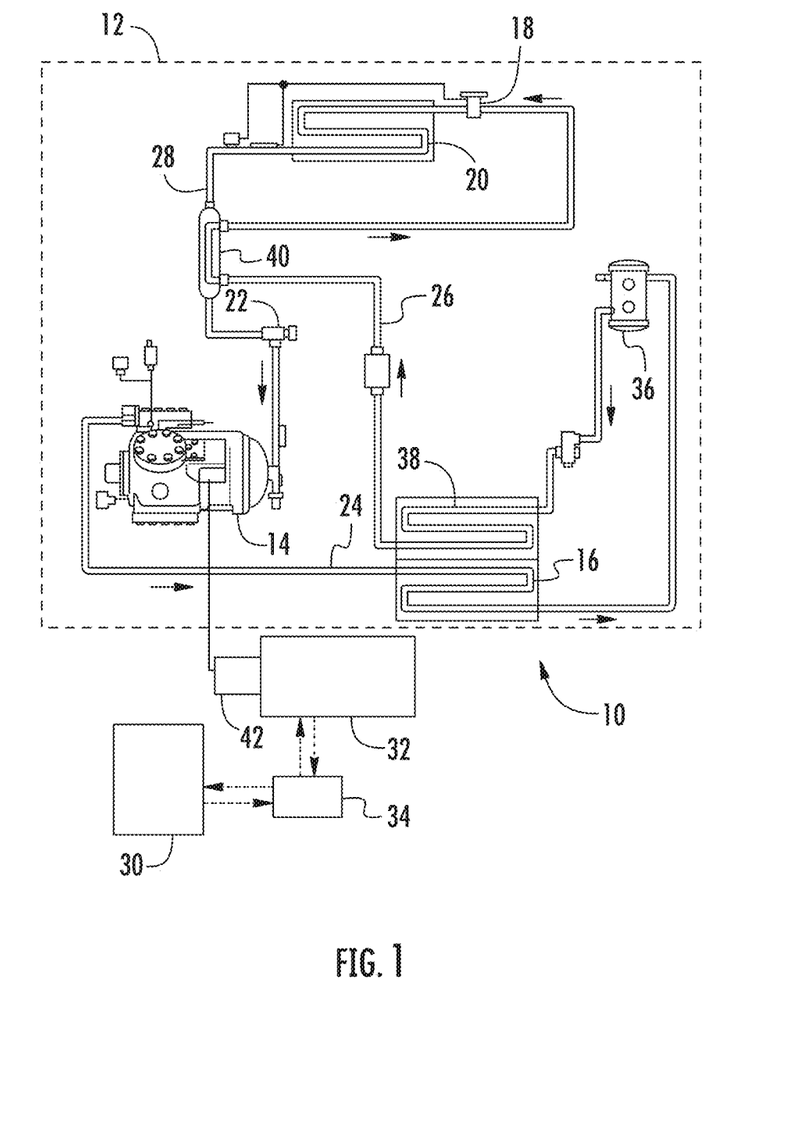
FIG. 1 shows a transport refrigeration system wherein one or more of the features of the disclosed embodiments may be utilized.
Figure 2:
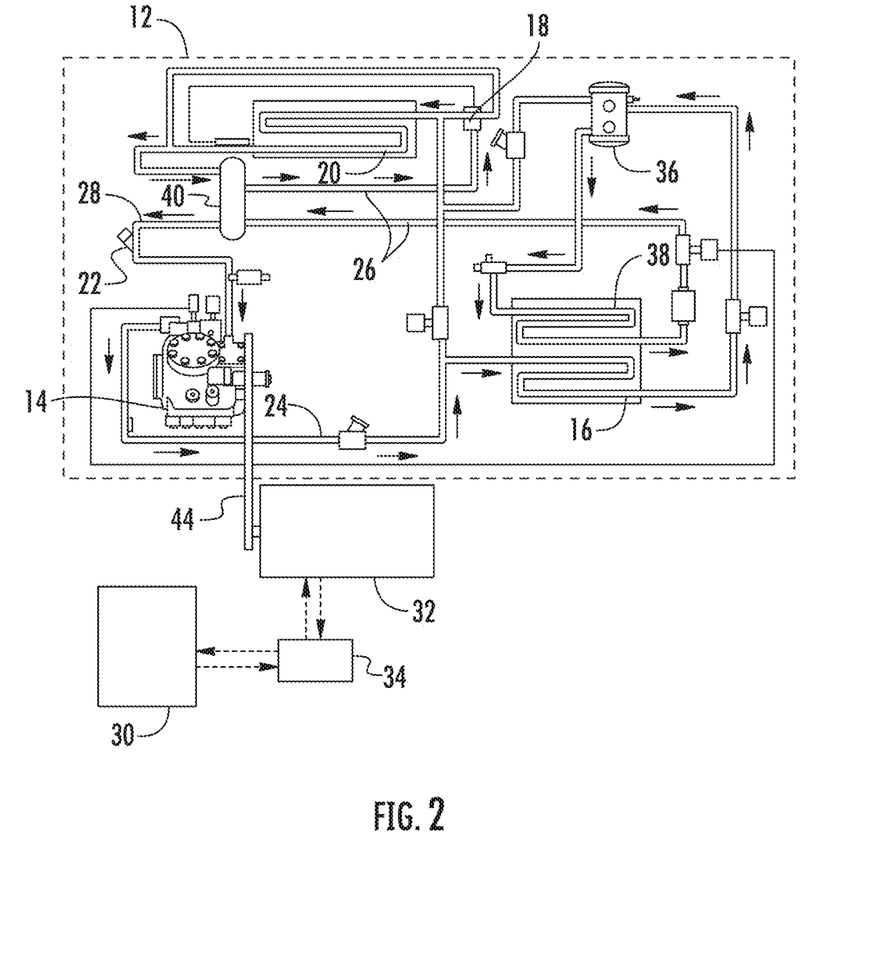
FIG. 2 shows another a transport refrigeration system wherein one or more of the features of the disclosed embodiments may be utilized.
Figure 3:
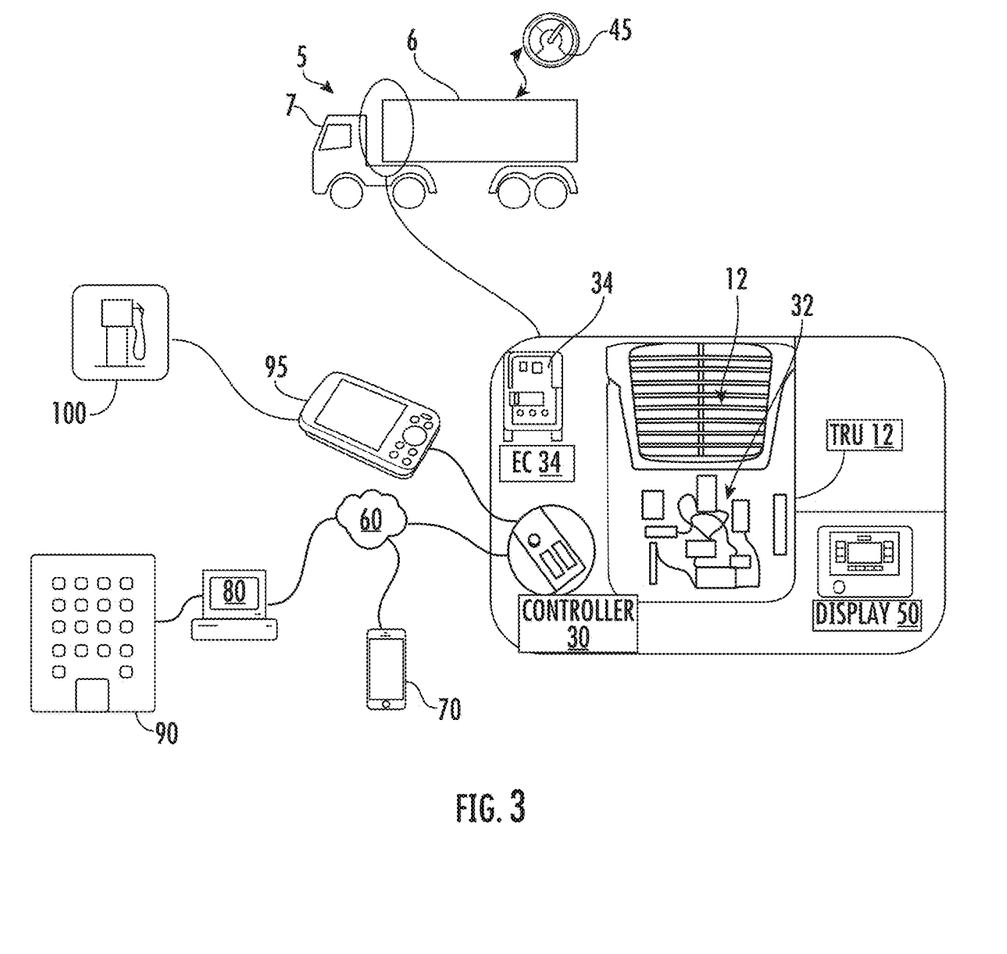
FIG. 3 shows additional features of a transport refrigeration system wherein one or more of the features of the disclosed embodiments may be utilized.

Referring initially to FIGS. 1 and 2, there are depicted exemplary embodiments of transport refrigeration systems (transport refrigeration system) 10 for controlling the temperature of the atmosphere within the refrigerated container 6 of the transport refrigeration system 10, which may be hauled by a truck 5 (FIG. 3). The refrigerated container 6 may be for example a trailer (FIG. 3), intermodal container or similar cargo transportation unit hauled by a tractor 7 (FIG. 3) or a rail car. The transport refrigeration system 10 includes a transport refrigeration unit (TRU) 12 including a compressor 14, a (refrigerant) condenser heat exchanger 16, an expansion device 18, a (refrigerant) evaporator heat exchanger 20 and a suction modulation valve 22 connected in a closed loop refrigeration circuit including refrigerant lines respectively 24, 26 and 28 and arranged in a conventional refrigeration cycle.

The transport refrigeration system 10 further includes, in addition to the TRU 12, an electronic primary controller (primary controller) 30, a (diesel) engine 32 and an engine controller (EC) 34. The transport refrigeration system 10 is mounted as in conventional practice to an exterior wall of the truck 5 (FIG. 3) with the compressor 14 and the condenser heat exchanger 16 with its associated condenser fan(s) (not illustrated) and engine 32 disposed externally of the refrigerated container. The EC 34, also known as powertrain control module (PCM), engine control unit (ECU), or auto engine computer (automotive engine control module) may be considered the brain of the engine 32. A EC 34 when malfunctioning may produce an activated check engine light, an engine misfiring, an engine stalling, a decreased engine performance, and/or a non-starting engine.

When the transport refrigeration system 10 is operating in a cooling mode, low temperature, low pressure refrigerant vapor is compressed by the compressor 14 to a high pressure, high temperature refrigerant vapor and passed from the discharge outlet of the compressor 14 into refrigerant line 24. The refrigerant circulates through the refrigerant circuit via refrigerant line 24 to and through the heat exchange tube coil or tube bank of the condenser heat exchanger 16, wherein the refrigerant vapor condenses to a liquid, thence through the receiver 36, which provides storage for excess liquid refrigerant, and thence through the subcooler coil 38 of the condenser. The subcooled liquid refrigerant then passes through refrigerant line 24 through a first refrigerant pass of the refrigerant-to-refrigerant heat exchanger 40, and thence traverses the expansion device 18 before passing through the evaporator heat exchanger 20. In traversing the expansion device 18, which may be an electronic expansion valve (EXV) as depicted in FIG. 1 or a mechanical thermostatic expansion valve (TXV) as depicted in FIG. 2, the liquid refrigerant is expanded to a lower temperature and lower pressure prior to passing to the evaporator heat exchanger 20.

In flowing through the heat exchange tube coil or tube bank of the evaporator heat exchanger 20, the refrigerant evaporates, and is typically superheated, as it passes in heat exchange relationship return air drawn from the refrigerated container 6 passing through the airside pass of the evaporator heat exchanger 20. The refrigerant vapor thence passes through the refrigerant line 26, the refrigerant vapor traverses a second refrigerant pass of the refrigerant-to-refrigerant heat exchanger 40 in heat exchange relationship with the liquid refrigerant passing through the first refrigerant pass thereof. Before entering the suction inlet of the compressor 14, the refrigerant vapor passes through the suction modulation valve 22 disposed in refrigerant line 26 downstream with respect to refrigerant flow of the refrigerant-to-refrigerant heat exchanger 40 and upstream with respect to refrigerant flow of the compressor 14. By selectively reducing the open flow area through the suction modulation valve 22 with the primary controller 30 (FIG. 3) a flow of refrigerant vapor supplied to the compressor 14 is selectively restricted, thereby reducing the capacity output of the transport refrigeration system 10 and in turn reducing the power demand imposed on the engine 32.

Air drawn from within the refrigerated container 6 by the evaporator fan(s) (not shown) associated with the evaporator heat exchanger 20, is passed over the external heat transfer surface of the heat exchange tube coil or tube bank of the evaporator heat exchanger 20 and circulated back into the interior space of the refrigerated container 6. The air drawn from the refrigerated container 6 is referred to as "return air" and the air circulated back into the refrigerated container 6 is referred to as "supply air". It is to be understood that the term "air" as used herein includes mixtures of air and other gases, such as for example, but not limited to nitrogen or carbon dioxide, sometimes introduced into a refrigerated container 6 for transport of perishable product such as produce.

Although the particular type of evaporator heat exchanger 20 used is not limiting of the disclosed embodiments, the evaporator heat exchanger 20 may, for example, comprise one or more heat exchange tube coils, as depicted in the drawing, or one or more tube banks formed of a plurality of tubes extending between respective inlet and outlet manifolds. The tubes may be round tubes or flat tubes and may be finned or un-finned.

The compressor 14 may comprise a single-stage or multiple-stage compressor such as, for example, a reciprocating compressor as depicted in the exemplary embodiments shown in FIGS. 1 and 2. However, the compressor 14 may be a scroll compressor or other type of compressor as the particular type of compressor used is not germane to or limiting of the disclosed embodiments. In the exemplary embodiment of FIG. 1, the compressor 14 comprises a reciprocating compressor having a compressing mechanism, an internal electric compressor motor and an interconnecting drive shaft that are all sealed within a common housing of the compressor 14. The engine 32 drives an electric generator 42 that generates electrical power for driving the compressor motor, which in turn drives the compression mechanism of the compressor 14. The drive shaft of the engine 32 drives the generator shaft. In the embodiment of FIG. 2, the compressor 14 is a reciprocating compressor having a compressing mechanism with a shaft driven directly by the drive shaft of the engine 32, either through a direct mechanical coupling or through a belt drive 44 as illustrated in FIG. 2.

Turning to FIG. 3, additional features of the transport refrigeration system 10 are illustrated. As indicated, the transport refrigeration system 10, including the TRU 12, the primary controller 30, the engine 32 and the EC 34, may be disposed the refrigerated container 6 of the truck 5, and hauled by the tractor 7. A thermostat 45 may be provided in the truck 5 for use by the primary controller 30 in controlling the EC 34 to operate the TRU 12. A primary display 50 for the transport refrigeration system 10 may be provided to display faults and other information obtained from the EC 34. The primary controller 30 may be linked, for example by a wireless network 60, to one or more of a mobile device 70, e.g., a cellular phone for a driver of the truck 5, a central server 80 located in a central hub 90, which may be fleet headquarters, and a service station 100 that may be in route. With the configuration, the primary controller 30 may communicate the faults and other information obtained by the EC 34, and provide other health and status data, temperature and otherwise, as may be required. The primary controller 30 may also be equipped to with a global positioning system (GPS) 95, which can be used to obtain relative distances between the truck 5, the central hub 90 and the service station 100 that may be in-route.

Figure 4:
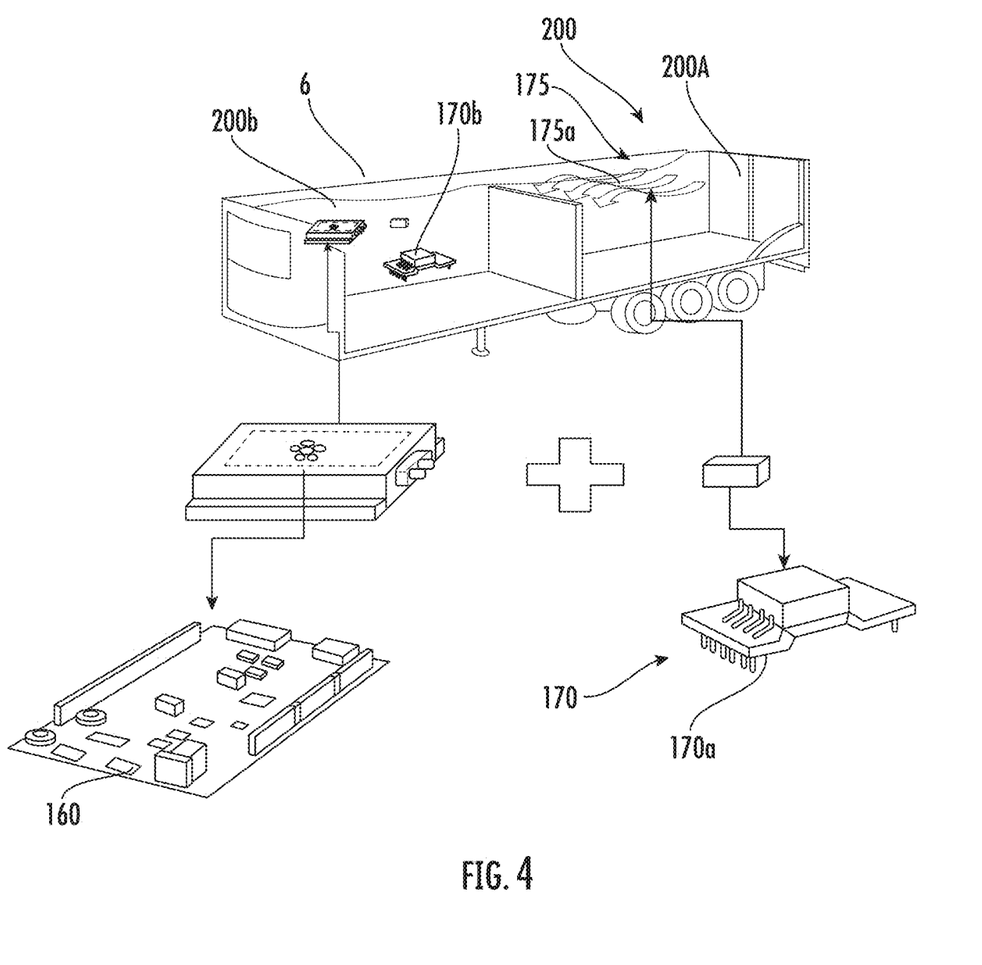
FIG. 4 shows a transport refrigeration system according to a disclosed embodiment.

Turning to FIG. 4, the transport refrigeration system 10 includes a hazard detection system 150, which is a distributed system as disclosed herein. The hazard detection system 150 includes an auxiliary controller 160, which may be a microprocessor. In some embodiments the auxiliary controller 160 is integral with the primary controller 30 (FIG. 3). The hazard detection system 150 may also encompass controls for activation of external safety systems, such as exhaust fans in case of a refrigerant or other gas leak, extinguishers in case of a fire, and the like. A plurality of sensors 170, including a first sensor 170a and a second sensor 170b, are disposed in a respective plurality of compartmentalized rooms (compartments) 200, including a first compartment 200a and a second compartment 200b, of the refrigerated container 6. In the illustrated embodiment the plurality of sensors 170 are gas detectors and the refrigerated container 6 is a trailer cargo box. The plurality of sensors 170 are configured to detect refrigerant leaks within the compartments 200 of the refrigerated container 6. Each of the plurality of sensors 170 may communicate with and be controlled by the auxiliary controller 160. In the hazard detection system 150 each of the plurality of sensors 170 may be located proximate one of a respectively plurality of fans 175, including a first fan 175a proximate the first sensor 170a. The plurality of fans 175 draw gasses toward the respective one of the plurality of sensors 170 to enable detecting a refrigerant leak.

Figure 5:
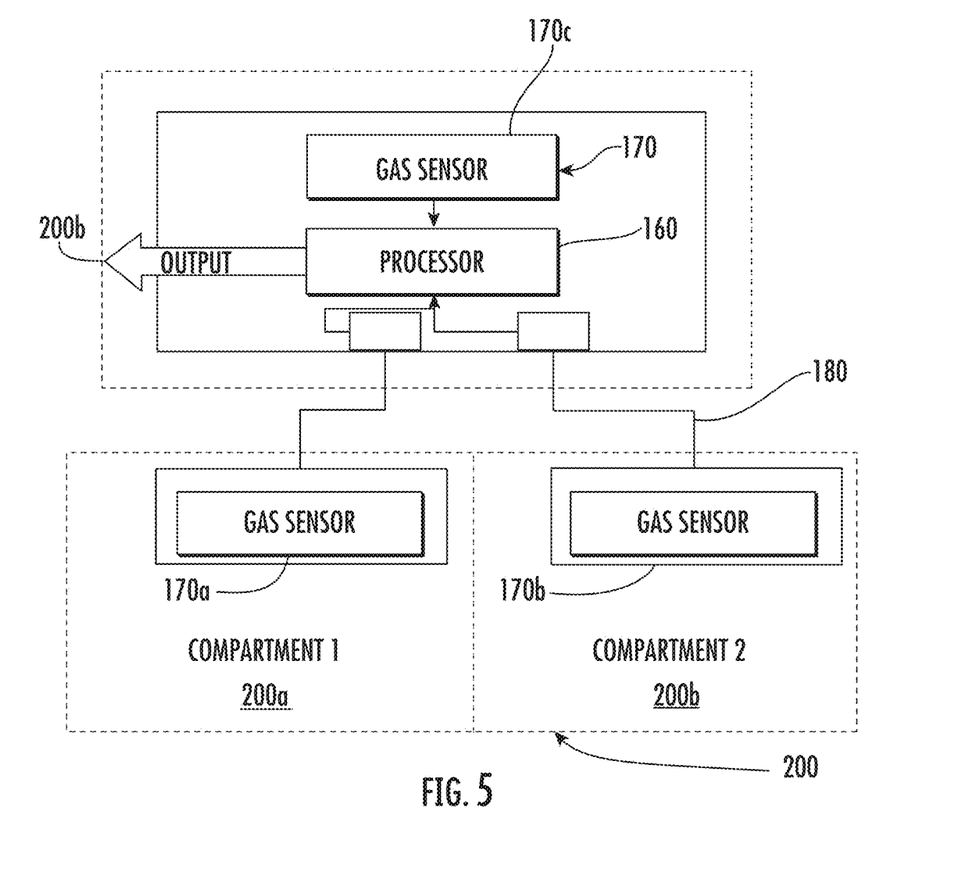
FIG. 5 shows a schematic of components of a transport refrigeration system according to a disclosed embodiment.

Turning to FIG. 5, the hazard detection system 150 includes electrical connections 180 to integrate the plurality of sensors 170, including the first sensor 170a and the second sensor 170b disposed in the respective plurality of compartments 200, including the first compartment 200a and the second compartment 200b, of the refrigerated container 6. The electrical connections 180 are configured to provide power as well as communications between the plurality of sensors 170 and the auxiliary controller 160. In one embodiment, one sensor 170c (not illustrated in FIG. 4) of the plurality of sensors 170 may be integrated into the auxiliary controller 160. The hazard detection system 150 would remain distributed so long as at least one of the first sensor 170a and the second sensor 170b is remotely controlled by the auxiliary controller 160.

The auxiliary controller 160 can translate information from the plurality of sensors 170 from the plurality of compartments 200 and communicate with the primary controller 30. From this, the primary controller 30 may output a response 210 which may include communicating an alert and/or to engaging in a safety procedure. Such procedure may include venting using the plurality of fans 175 and/or to engage a warning system. In one embodiment the primary controller 30 may send an alert to one or more of the primary display 50, the mobile device 70 of the driver or other designated person, to the central server 80 and the service station 100 that may be in-route, that a hazard condition is detected and requires attention.

Figure 6:
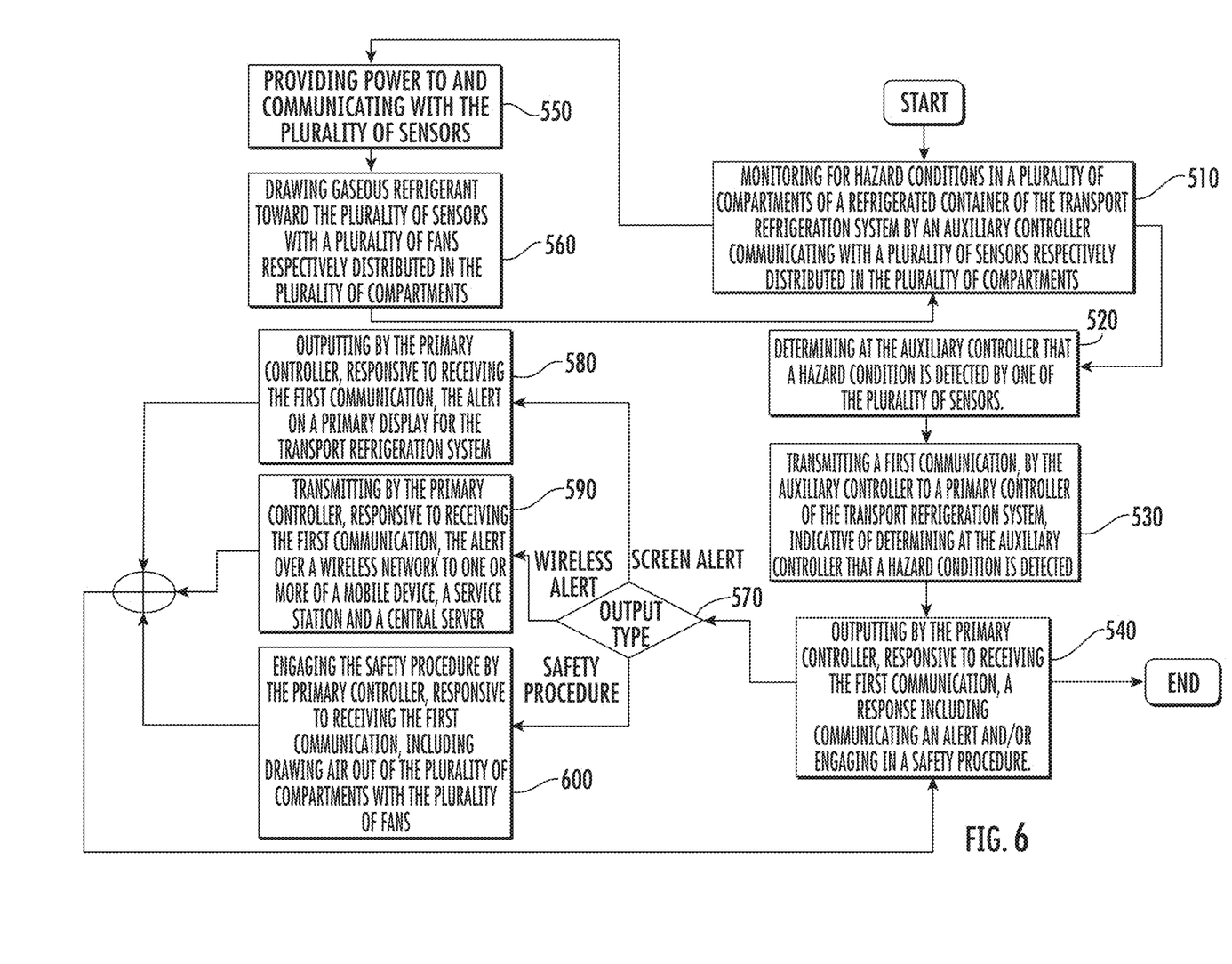
FIG. 6 shows a method of detecting a hazard in a transport refrigeration system according to a disclosed embodiment.

Turning to FIG. 6, a method of monitoring for hazards in a transport refrigeration system 10 is illustrated. The method includes block 510 of monitoring for hazard conditions in a plurality of compartments 200 of a refrigerated container 6 of the transport refrigeration system 10 by the auxiliary controller 160 communicating with a plurality of sensors 170 respectively distributed in the plurality of compartments 200. Block 520 includes determining at the auxiliary controller 160 that a hazard condition is detected by one of the plurality of sensors 170. Block 530 includes transmitting a first communication, by the auxiliary controller 160 to a primary controller 30 of the transport refrigeration system 10, indicative of determining at the auxiliary controller 160 that a hazard condition is detected. Block 540 includes outputting by the primary controller 30, responsive to receiving the first communication, a response including communicating an alert and/or engaging in a safety procedure.

In one embodiment, block 510 includes block 550 of providing power to and communicating with the plurality of sensors 170. Block 510 may also include block 560 of drawing gaseous refrigerant toward the plurality of sensors 170 with a plurality of fans 175 respectively distributed in the plurality of compartments 200.

In one embodiment, block 540 includes block 580 of outputting by the primary controller 30, responsive to receiving the first communication, the alert on a primary display 50 for the transport refrigeration system 10 ("screen alert" output type at block 570). Block 540 may include block 590 of transmitting by the primary controller 30, responsive to receiving the first communication, the alert over the wireless network 60 to one or more of the mobile device 70, the service station 100 and the central server 80 ("wireless alert" output type at block 570). Block 540 may include block 600 of engaging the safety procedure by the primary controller 30, responsive to receiving the first communication, including drawing air out of the plurality of compartments 200 with the respective plurality of fans 175 ("safety procedure" output type at block 570).

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A transport refrigeration system, comprising:
    a primary controller located on the transport refrigeration system, that is linked via a wireless network, to one or more of a mobile device, a central server, and an in-route service station;
    a refrigerated container with a plurality of compartments;
    a hazard detection system located on the transport refrigeration system, comprising:
        an auxiliary controller operatively connected to the primary controller;
        a plurality of sensors respectively distributed in the plurality of compartments of the refrigerated container, each of the plurality of sensors operationally connected to and controlled by the auxiliary controller,
            wherein the plurality of sensors are configured to detect refrigerant, and wherein the plurality of sensors receive power from and communicate with the auxiliary controller, and
        a plurality of fans distributed in the plurality of compartments,
            the plurality of fans configured to draw surrounding air toward the plurality of sensors, whereby the sensors monitor for gaseous refrigerant,
    wherein the auxiliary controller is configured to transmit a first communication, to the primary controller, indicative of a detection of gaseous refrigerant at one or more of the plurality of sensors; and
    wherein the primary controller is configured to engage in a safety procedure upon receiving the first communication, which includes transmitting an alert via the wireless network, and responsive to the safety procedure the plurality of fans draw air out of the plurality of compartments for venting.

2. The transport refrigeration system of claim 1, comprising a primary display that is onboard the transport refrigeration system, and
    wherein the primary controller is configured to provide the alert on the primary display when the primary controller receives the first communication.

3. The transport refrigeration system of claim 1, wherein the primary controller is configured to communicate the alert over the wireless network to one or more of the mobile device, the service station and the central server when one of the plurality of sensors detects refrigerant.

4. A method of monitoring for hazards in a transport refrigeration system, comprising:
    monitoring for a hazard condition in a plurality of compartments of a refrigerated container of the transport refrigeration system by an auxiliary controller on board the transportation refrigeration system, wherein the auxiliary controller provides power to, and communicates with, a plurality of sensors respectively distributed in the plurality of compartments, wherein the plurality of sensors are configured to detect refrigerant;
    monitoring for hazards includes drawing gaseous refrigerant toward the plurality of sensors with a plurality of fans respectively distributed in the plurality of compartments;
    determining at the auxiliary controller that the hazard condition is detected by one of the plurality of sensors;
    transmitting a first communication, by the auxiliary contoller to a primary contoller on board the transport refrigeration system, indicative of determining at the auxiliary controller that the hazard condition is detected, wherein the primary controller is linked via a wireless network to one or more of a mobile device, a central server, and an in-route service station; and
    engaging, by the primary controller, in a safety procedure upon receiving the first communication, which includes transmitting an alert via the wireless network, and responsive to the safety procedure the plurality of fans draw air out of the plurality of compartments for venting.

5. The method of claim 4, comprising:
    outputting by the primary controller, responsive to receiving the first communication, the alert on a primary display for the transport refrigeration system.

6. The method of claim 4, comprising:
    transmitting by the primary controller, responsive to receiving the first communication, the alert over the wireless network to one or more of the mobile device, the service station and the central server.

* * * * *